United States Patent
Nakada et al.

(10) Patent No.: US 6,851,311 B2
(45) Date of Patent: Feb. 8, 2005

(54) THERMAL-TYPE FLOW METER WITH BYPASS PASSAGE

(75) Inventors: Keiichi Nakada, Hitachinaka (JP); Izumi Watanabe, Hitachinaka (JP); Junichi Horie, Hitachinaka (JP); Kei Ueda, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 194 days.

(21) Appl. No.: 10/106,539

(22) Filed: Mar. 27, 2002

(65) Prior Publication Data

US 2003/0110854 A1 Jun. 19, 2003

(30) Foreign Application Priority Data

Dec. 19, 2001 (JP) ........................................ 2001-386534

(51) Int. Cl.[7] ............................................... G01F 1/68
(52) U.S. Cl. ................. 73/204.26; 73/202.5; 73/204.22
(58) Field of Search ......................... 73/204.22–204.26, 73/202, 202.5, 204.11

(56) References Cited

U.S. PATENT DOCUMENTS 5,892,146 A * 4/1999 Kobayashi et al. ......... 73/202.5
6,253,606 B1 * 7/2001 Yonezawa et al. ......... 73/202.5

FOREIGN PATENT DOCUMENTS

| DE | 19655001 | 10/2000 |
|---|---|---|
| JP | 06-050783 | 2/1994 |
| JP | 09-304147 | 11/1997 |
| JP | 2001-183204 | 7/2001 |
| WO | 99/14560 | 3/1999 |
| WO | WO 99/53274 | 10/1999 |
| WO | WO 01/79790 | 10/2001 |

* cited by examiner

Primary Examiner—Harshad Patel
(74) Attorney, Agent, or Firm—Crowell & Moring LLP

(57) ABSTRACT

A flow measurement sensor accurately outputs signals even when pulsation flow is generated at high engine speed and also when pulsation flow accompanying reverse flow is generated. The flow measurement sensor has a flow measurement element which has a heater resistance pattern on one side of a plate-shaped member, and a bypass passage in which the flow measurement element is disposed, a first outlet through which fluid flowing along the surface of the flow measurement element flows out, and a second outlet through which fluid flowing along the back side of the flow measurement element flows out. The second outlet is positioned at a different location from the first outlet.

19 Claims, 7 Drawing Sheets

G-G

H-H

I-I

J-J

THERMAL-TYPE FLOW METER WITH BYPASS PASSAGE

BACKGROUND OF THE INVENTION

1. Field of the Invention

The present invention relates to a flow measurement sensor for measuring a flow rate by using a heater resistance (=heating resistor), for example, a flow measurement sensor which is suitable for measuring the intake air flow rate of an internal combustion engine to control fuel supply.

2. Prior Art

Conventionally, as a flow measurement sensor which is installed in an intake air flow passage of an internal combustion engine, such as an automobile or the like, to measure the intake air flow rate, thermal-type flow measurement sensors have been main stream because they can directly detect the mass flow rate. Of such thermal-type flow measurement sensors, a flow measurement sensor which is produced on a semiconductor substrate, such as silicon (Si) or the like, by using semiconductor micro processing technology has been popular because it is relatively economical due to easy mass production, small, and can be driven by low power.

As such flow measurement sensors, for example, there are well-known flow measurement sensors which are disclosed in Japanese Application Patent Laid-open Publication No. Hei 06-50783, No. 2001-183204, and Japanese Application Patent Notification Publication No. 2001-505314. Flow measurement sensors disclosed in those publications use a flow measurement element which is arranged such that a thin-film sensor area is formed on a semiconductor substrate, such as silicon (Si) or the like, by using semiconductor micro processing technology, and a sensing resistance(=resistor) is formed on the thin-film area to increase thermal response speed. In such a fast-response flow measurement element, response is possible even when pulsation flow occurs in an intake pipe, thereby reducing the measurement error at the time of generation of the pulsation flow. Further, with a direction detecting function, the measurement error can be reduced even in an operating condition where air flow (reverse flow) from the engine toward the air cleaner is generated.

Furthermore, in a thermal-response flow measurement element, as shown in the technology disclosed in Japanese Application Patent Laid-open Publication No. Hei 09-304147, there is a means that uses two feedback circuits to increase measurement accuracy when pulsation flow and reverse flow occur.

This kind of flow measurement sensor mainly consists of a flow measurement element, a support member for mounting said flow measurement element, a circuit for driving the flow measurement element, and a casing which packages those parts and is mounted to an intake air flow pipe. Said flow measurement element is disposed inside the bypass passage.

Conventionally, pulsation of intake air becomes large when a 4-cylinder engine is driven at low speed, and reverse flow is frequently generated when a throttle is nearly full open. However, in an engine which conducts complex controls, such as a continuous variable Valve Timing mechanism or the like, so as to respond to regulation of exhaust gas and fuel saving, pulsation flow and reverse flow occur at high engine speed and the amount of reverse flow tends to increase. Further, in a multiple cylinder engine which has four cylinders or more, pulsation flow accompanying reverse flow is generated.

In the technology disclosed in said Japanese Application Patent Laid-open Publication No.2001-183204 and said Japanese Application Patent Notification Publication No. 2001-505314, one air flow is divided into two by a support member: the flow on the face side of the support member and the flow on the back side; and then the two separate air flows rejoin each other at the downstream of the support member. A flow measurement element is mounted to one side of the support member. In this arrangement, when pulsation flow occurs, flow pulsates on both the aforementioned face side and the back side. Accordingly, once pulsation deviation is generated between the flow measurement element mounting surface and the other surface where the flow measurement element is not mounted, the pulsation becomes very complicated and sufficient measurement accuracy cannot be obtained.

Further, the flow-dividing ratio at the time the support member divides the flow into face side flow and back side flow easily changes depending on the conditions of the steady flow or pulsation flow, thereby causing the flow rate error.

Further, said Japanese Application Patent Laid-open Publication No. Hei 06-50783 has disclosed technology in which air flows only on the surface side of the flow measurement element. However, in this structure, moisture easily adheres to the thin film member of the flow measurement element, and once moisture adheres, a problem arises because accurate flow measurement becomes impossible while the moisture is present. When there is moisture in the air flow, or when a large amount of moisture enters an intake pipe depending on the ambient environment, the moisture which has entered the bypass passage adheres to the wall surface and then easily accumulates into a relatively large droplet of water. In the structure disclosed in said Japanese Application Patent Laid-open Publication No. Hei 06-50783, the accumulated water droplets can easily reach the flow measurement element. Furthermore, when condensation, occurs in the bypass passage, relatively large droplets of water easily adhere to the flow measurement element. In general, a flow measurement element for automobiles is feedback controlled so as to be heated up to a prescribed value (Th) of 100° C. or higher from the room temperature. If a water droplet adheres, the affected area will not be heated to more than 100° C. until the water droplet is removed; however, the feedback circuit tries to adjust the control so that the value becomes Th, thereby causing overcurrent. If a boiling phenomenon occurs in the water droplet casing air bubbles to generate, the bubble generating area (area which comes in contact with air) is heated up to a very high temperature due to the overcurrent, which may cause damage.

Further, there is no problem with the above-mentioned technology if dust-collecting performance of the air cleaner located at the upstream of the flow measurement sensor is adequate. However, if the air filter of the air cleaner is removed or particles which have passed through the air filter accumulate by crosslinking a liquid, such as oil or water, present in an intake pipe, there is a possibility that particles which may destroy the thin film member of the flow measurement element may reach and adhere to the surface of the flow measurement element.

As described above, it is difficult for the prior art to simultaneously and adequately satisfy the functions: the reduction of the measurement error when intake air flow pulsates, prevention of measurement accuracy from decreasing due to the presence of water droplets, and prevention of dust present in intake air from impinging on the flow measurement element.

SUMMARY OF THE INVENTION

The main object of the present invention is to provide a flow measurement sensor in which pulsation detected by the flow measurement element is not affected by pulsation generated on the back side of the support member, thereby providing the accurate measurement when pulsation flow and reverse flow occur.

Another object of the present invention is to provide a flow measurement sensor which can perform accurate flow measurement and repel condensation even in an environment where water droplets are present.

Another object of the present invention is to provide a flow measurement sensor which can reduce the measurement error and ensure the reliability when pulsation flow occurs.

In order to solve aforementioned problems, the present invention provides a flow measurement sensor comprising a flow measurement element having a heater resistance pattern provided on one side of a plate-shaped member, and a bypass passage in which the flow measurement element is disposed, wherein said bypass passage comprises a common inlet, a first outlet through which fluid that has entered from the inlet and flows along the surface of said flow measurement element flows out, and a second outlet through which fluid that has entered from the inlet and flows along the back side of said flow measurement element flows out, and said second outlet is positioned at a different location from said first outlet.

Another characteristic of the present invention is to provide a flow measurement sensor comprising a flow measurement element having a heater resistance pattern provided on one side of a plate-shaped member, a support member to which said flow measurement element is mounted, and a bypass passage in which said support member is disposed, wherein said bypass passage comprises a common inlet, a first outlet through which fluid that has entered from the inlet and flows along the surface of said flow measurement element flows out, and a second outlet through which fluid that has entered from the inlet and flows along said support member surface to which said flow measurement element is not mounted flows out, and said second outlet is positioned at a different location from said first outlet.

These structures divide the forward flow in the bypass passage into the face-side flow and the back-side flow by the flow measurement element or the support member when pulsation flow occurs. However, the separate flows flow out from respective outlets and do not rejoin each other. Further, if reverse flow is generated, one flow reverses along the surface of the flow measurement element and another flow reverses along the back side of the flow measurement element or the back side of the support member. Thus, according to the present invention, when pulsation flow occurs, the pulsation detected by the flow measurement element is not affected by the pulsation generated on the back side of the support member. Accordingly, measurement accuracy can be high at the time of generation of the pulsation flow and reverse flow.

Another characteristic of the present invention is that said support member is located near the center of said bypass passage, and the support member divides said bypass passage into two passages: a first passage through which fluid flows along the support member surface to which said flow measurement element is not mounted or the back side of said flow measurement element, and a second passage through which fluid flows along the surface of said flow measurement element.

Another characteristic of the present invention is that said flow measurement element is mounted to one side of said support member so that its surface becomes lower than the flat surface of said support member.

According to those characteristics of the present invention, water droplets which have accumulated on the surface of the bypass passage wall do not reach the surface of the flow measurement element, thereby the accurate flow measurement is possible in an environment where water droplets are generated. Further, compared to the arrangement in which the element is embedded in the surface of the bypass passage wall, condensation does not easily occur.

Furthermore, another characteristic of the present invention is that the radius of said bypass passage gradually becomes smaller in the direction of the forward flow in the bypass passage, and said flow measurement element is disposed inside in the radial direction from the outer-wall surface of said bypass passage.

According to the present invention, because the bypass passage is structured to generate a centrifugal force, the inertia effect prevents dust and moisture from impinging on the surface of the flow measurement element, thereby increasing the reliability. Accordingly, by applying the aforementioned technology to this function, it is possible to reduce the measurement error and ensure the reliability when pulsation flow occurs.

Furthermore, another characteristic of the present invention is that said flow measurement element or said support member is disposed such that the flow measurement sensor mounting side is inclined so as to face the forward flow in the main passage in which the flow measurement sensor is positioned. This arrangement makes it possible to provide a flow measurement sensor which has, in addition to the aforementioned effect, weak flow noise under the steady flow conditions.

DESCRIPTION OF THE INVENTION

Figure 1A:
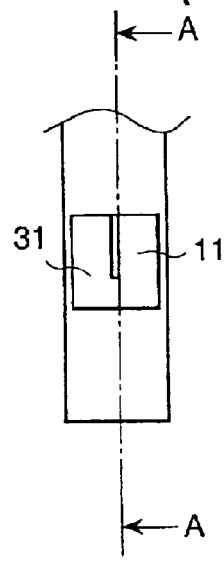
FIG. 1 shows a flow measurement sensor which is a first embodiment of the present invention, wherein (A) is a top view of (B), (B) is an A—A sectional view of (A), and (C) is a B—B sectional view of (B).
Figure 1B:
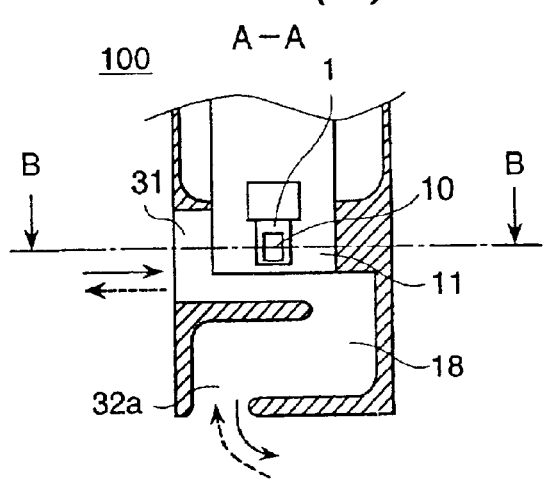
Figure 1C:
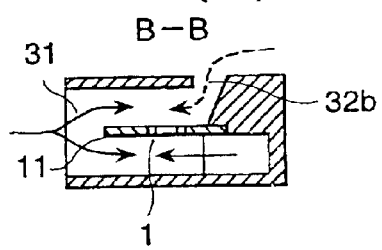

Embodiments of the present invention will be described below with reference to the drawings. First, a first embodiment of the present invention will be described with reference to FIGS. 1 through 4. FIG. 1 shows a flow measurement sensor which is a first embodiment of the present invention, and FIG. 1(B) is an A—A sectional view of FIG. 1(A), FIG. 1(A) is a top view of FIG. 1(B), and FIG. 1(C) is a B—B sectional view of FIG. 1(B). Further, FIG. 2 shows the arrangement in which a flow measurement sensor shown in FIG. 1 is mounted to the intake duct of an engine;

A flow measurement sensor 100 of a first embodiment comprises a flow measurement element 1 which has a heater resistance pattern, i.e. thin film structure 10, on one side of a plate-shaped support member 11, and a bypass passage 18 in which the flow measurement element 1 is disposed. The flow measurement element 1 is fixed to a concaved portion (see FIG. 11) provided in one side of the support member 11 so that the surface becomes slightly, for example, approximately 10 μm lower than the flat surface of the support member 11 by epoxy or silicon adhesive. As understood from the top view, the support member 11 is located near the center of the bypass passage 18 and divides the bypass passage 18 into a first passage through which fluid flows along the support member surface to which the flow measurement element is not mounted, and a second passage through which fluid flows along the surface of the flow measurement element. The bypass passage 18 comprises an inlet 31, a first outlet 32a through which fluid flowing along the surface of the flow measurement element flows out, and a second outlet 32b through which fluid flowing along the back side of the flow measurement element flows out. It is also possible that a plurality of second outlets 32b are provided at different locations from the first outlet 32a. That is, the first outlet 32a opens in the direction perpendicular to the axial direction (air flow direction) of the main passage 16. Further, the second outlet 32b opens in the direction perpendicular to the axial direction of the main passage 16 and also facing the opposite side of the first cutlet 32a. This arrangement divides the fluid into two: the one that flows along the support member 11 surface to which the flow measurement element 1 is not mounted or the back side of the flow measurement element 1, and the other that flows along the surface of the flow measurement element 1.

Moreover, the electrode for the flow measurement element 1 and the electrode for the support member 11 are electrically connected, for example, by a connecting line such as a metal wire, or the like.

Figure 2:
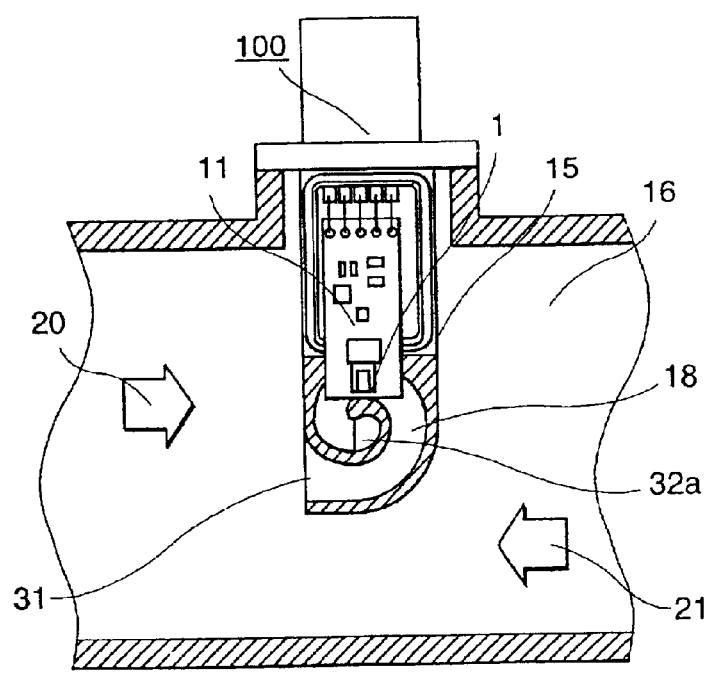
FIG. 2 shows the installation condition of the flow measurement sensor, shown in FIG. 1, mounted to the engine intake duct.

The support member 11 to which the flow measurement element 1 is attached is mounted to the housing case 15 by silicon adhesive as shown in FIG. 2. The housing case 15 is inserted into the main passage 16, for example, an intake air flow passage of an engine. In FIG. 2, the air flow (forward flow 20) from the air cleaner toward the engine direction in the main passage 16 flows from an inlet 31 of the bypass passage 18 to the first outlet 32a and the second outlet. Reference number 21 shows reverse air flow.

Figure 3A:
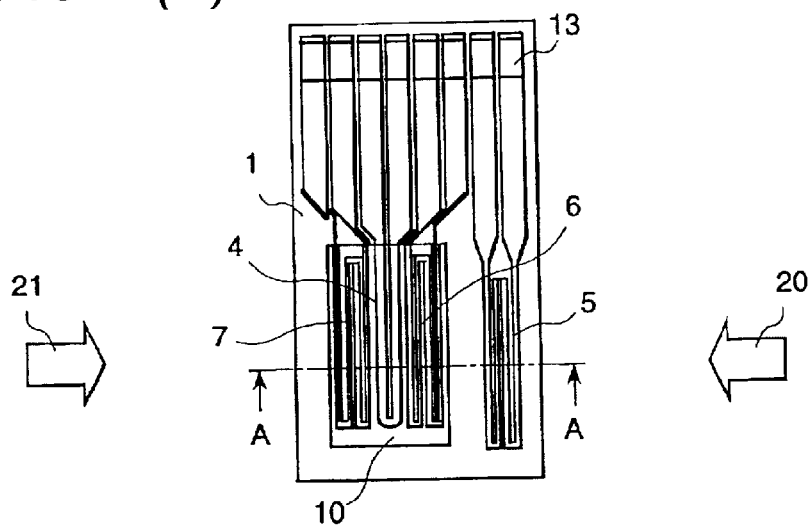
FIG. 3 shows the structure of the flow measurement element used for an embodiment of the present invention and its production method.
Figure 3B:
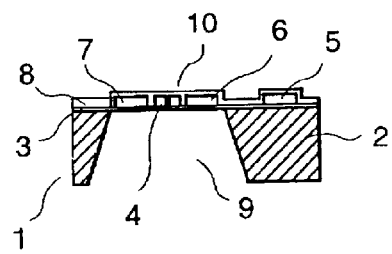

Next, the structure of the flow measurement element 1 used for the present invention and its production method will be described with reference to FIG. 3.

The flow measurement element 1 is produced by using semiconductor production technology. An example of the production method will be described below. First, a silicon dioxide layer is formed on a single crystal silicon substrate 2 as an electrical insulating layer 3 by using thermal oxidation or CVD (Chemical Vapor Deposition) technique, and a silicon nitride layer is formed by CVD or the like. Next, a polycrystalline silicon layer is formed by CVD or the like, and to attain a desired resistance, phosphorus (P) is doped as an impurity by thermal diffusion or ion implantation. Subsequently, the polycrystalline silicon layer is patterned to form a heater resistance 4, an intake-air temperature detecting resistance(=resistor) 5, and temperature measuring resistances(=resistors)) 6 and 7. Although the cost increases for a resistance(=resistor), employing platinum or the like makes it possible to form a resistance with high temperature coefficient.

Next, a silicon nitride layer and a silicon dioxide layer are formed by CVD or the like as a protective layer 8. Subsequently, the protective layer 8 is patterned by removing a portion thereof so as to form electrode 13. Then, an aluminum layer is formed and patterned by etching. Finally, in order to form a cavity 9, a silicon nitride layer is formed as a mask by CVD or the like on the single crystal silicon substrate 2 surface on which a heater resistance 4 is not formed. Then, the silicon nitride layer is patterned.

Subsequently, a cavity 9 is formed by anisotropic etching. Thus, by making a cavity, the area where the heater resistance 4 and temperature measuring resistances 6 and 7 are disposed changes into a thermally insulated thin film structure 10. This makes it possible to achieve a fast-response function of the flow measurement element 1. Finally, the substrate is diced into chips. A piece of diced flow measurement element 1 is that, for example, a long side is approximately 5 mm and a short side is approximately 2.5 mm.

Next, a support member 11 which mounts a flow measurement element 1 will be described with reference to FIG. 2. The support member 11 according to the present invention is made of a glass-ceramic laminating substrate. As a support member 11, it is also possible to employ high temperature calcination ceramics, metal plate, or the like. However, it is desirable that the flow measurement element 1 be thermally insulated from ambient members, therefore, it is effective to use a glass-ceramic laminating substrate having low thermal conductivity. Using the material having such low thermal conductivity results in greatly suppressing condensation to be generated on the surface of the flow measurement element.

Further, by employing a laminating substrate, it is possible to integrate a control circuit 12 for supplying power to the flow measurement element 1 and processing signals from the flow measurement element 1 into a support member 11. This can reduce the number of parts, thereby reducing costs and increasing reliability. Furthermore, by using an inner layer conductor of the laminating substrate to constitute a circuit for controlling the flow measurement element 1, it is possible to reduce the size of the circuit, thereby reducing the size of the flow measurement sensor 100.

Figure 4:
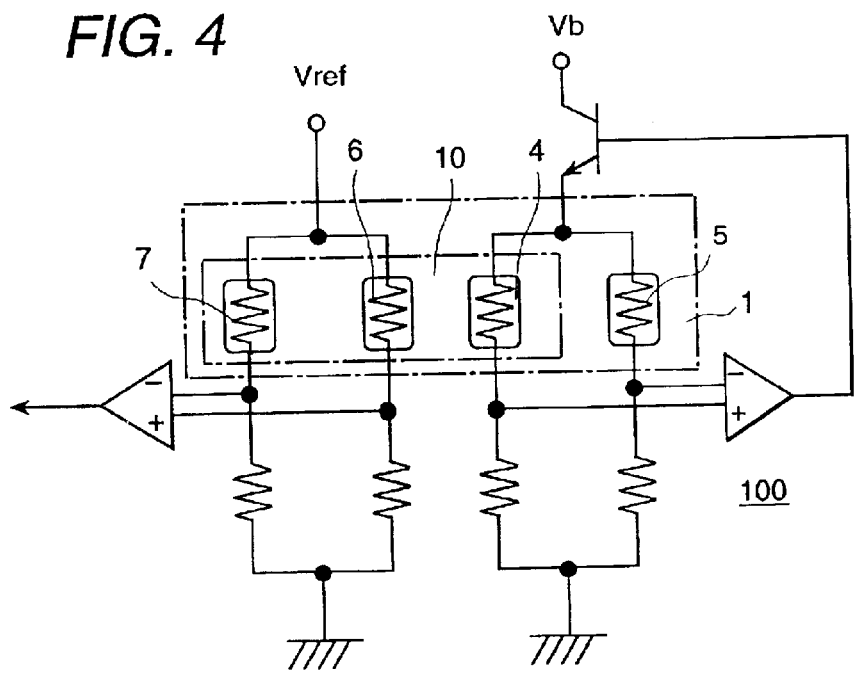
FIG. 4 is a circuit diagram that shows a drive system for the flow measurement sensor used for an embodiment of the present invention.

Now, the operational principle of the flow measurement element 1 will be described with reference to FIGS. 3 and 4. The heater resistance 4 is controlled so that its temperature becomes a specified degree higher than that of the intake-air temperature detecting resistance 5. The heater resistance 4 heats up the upstream-side temperature measuring resistance 6 and the downstream-side temperature measuring resistance 7 until their temperatures become a specified temperature. When there is no air flow, ideally, the upstream-side temperature measuring resistance 6 and the downstream-side temperature measuring resistance 7 are equally heated by the heater resistance 4 up to the same temperature. Therefore, the temperature difference between the upstream-side temperature measuring resistance 6 and the downstream-side temperature measuring resistance 7 becomes zero.

When air flow in the main passage 16 is forward flow 20, the upstream-side temperature measuring resistance 6 is cooled compared to the downstream-side temperature measuring resistance 7. Accordingly, a temperature difference occurs between the upstream-side temperature measuring resistance 6 and the downstream-side temperature measuring resistance 7. This causes a difference to the resistance value and as a result, a corresponding potential difference is generated. This potential difference caused by the temperature difference corresponds to the flow rate. Accordingly, it is possible to detect the flow rate.

On the other hand, when air flow in the main passage 16 is reverse flow 21, contrary to the above, the downstream-side temperature measuring resistance 7 is cooled compared to the upstream-side temperature measuring resistance 6. Accordingly, the flow rate can be detected.

In a first embodiment, the forward flow 20 which enters the bypass passage 18 from an inlet 31 is divided into the support member 11 face side flow End the back side flow by a support member 11. These separate flows flow out from a first outlet 32a and a second outlet 32b, respectively. The flows do not rejoin each other at the downstream of the support member as described in the conventional example. As a result, when pulsation flow occurs, pulsation generated on the back side of the support member 11 does not affect pulsation generated on the surface of the flow measurement element 1. For this reason, the waveform of the pulsation generated on the surface of the flow measurement element 1 in the bypass passage 18 corresponds to that of the pulsation of the forward flow 20 in the main passage 16. Consequently, the measurement error at the time of generation of the pulsation flow can be reduced.

On the other hand, when pulsation flow becomes large causing reverse flow 21 to generate, the reverse flow 21 on the surface side of the flow measurement element 1 enters from the first outlet 32a, and the reverse flow 21 on the back side of the support member 11 enters from the second outlet 32b.

According to the first embodiment of the present invention, the reverse flow which has entered from the first outlet 32a reaches the surface of the flow measurement element 1. Further, the reverse flow which has entered from the second outlet 32b flows through the space on the back side of the support member and then join the reverse flow which has entered from the first outlet 32a at the upstream of the support member. Thus, two reverse flows which have entered from different outlets will not rejoin until they pass the flow measurement element 1. In other word, they do not interfere with each other. At this point, if reverse flow 21 occurs, the flow direction is switched from the forward direction to the reverse direction on the surface of the flow measurement element 1. Therefore, if the switching of the flow direction in the main passage 16 cannot be handled, the measurement error easily occurs.

In the conventional example, reverse flow which entered from one outlet is divided into two flows at the downstream of the support member 1 and the separate two flows rejoin each other at the upstream of the support member. Accordingly, the switching of the flow direction on both the face side and the back side of the support member 11 interferes with each other, causing complex pulsation flow on the surface of the flow measurement element 1, thereby easily creating the measurement error.

However, in the present invention, when the flow direction is switched from the forward direction to the reverse direction on the surface of the flow measurement element 1, the flow on the back side of the support member 11 does not affect the flow measurement element 1. Accordingly, the measurement accuracy can be increased. Specifically, when the pulsation frequency is 60 Hz or more, the present invention significantly reduces the measurement error compared to the conventional example.

Further, as viewed from a forward direction, the support member 11 is not embedded in the surface of the bypass passage wall, but is located near the center of the bypass passage 18. This structure does not allow water droplets, which have adhered to the bypass passage 18 and accumulated, to reach the thin film member of the flow measurement element 1. As a consequence, the reliability is not adversely affected due to the improved measurement characteristic at the time of generation of the pulsation flow.

Furthermore, if the support member 11 is embedded in the surface of the bypass passage wall, engine heat is easily transmitted to the flow measurement element via the bypass passage wall. This structure easily causes the measurement error. However, in the present invention, the support member 11 comes in contact with the surface of the bypass passage 18 wall at a small area. Therefore, this structure is less affected by engine heat than the structure in which the support member 11 is embedded in the bypass passage wall, thereby the measurement error do not occur easily.

Figure 5A:
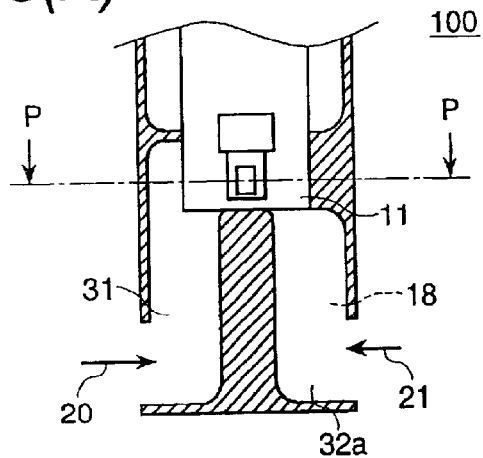
FIG. 5 is an altered example of a first embodiment of the present invention, wherein (A) is a longitudinal sectional view, and (B) is a P-PA sectional view of (A).
Figure 5B:
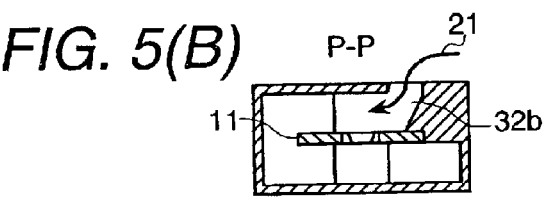

Moreover, as a shape of the bypass passage 18, another shape, shown in FIG. 5, is applicable for the first embodiment of the present invention. In this example, forward flow 20 enters from an inlet 31, flows through the bypass passage 18 which is bent at almost right angle, and then is divided into the flow measurement element 1 side flow and the back side flow by the support member 11. These separate air flows flow out separately from a first outlet 32a and a second outlet 32b. That is, the first outlet 32a faces perpendicular to the axial direction (the P—P direction in FIG. 5(A)) of the main passage 16. Further, the second outlet 32b opens in the direction perpendicular to the axial direction of the main passage 16.

In this example, the same effect as the aforementioned first embodiment can be obtained.

Figure 6A:
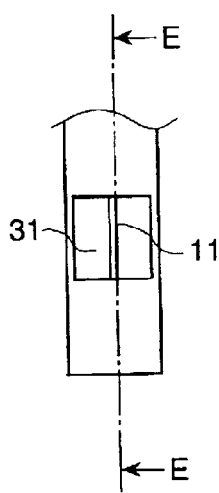
FIG. 6 shows a flow measurement sensor of a second embodiment of the present invention, wherein (A) is a top view of (B), (B) is an E—E sectional view of (A), and (C) is an F—F sectional view of (B).
Figure 6B:
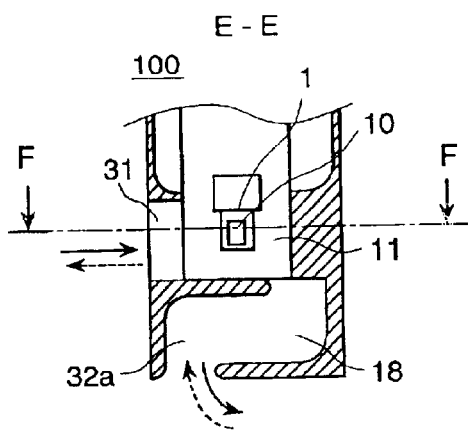
Figure 6C:
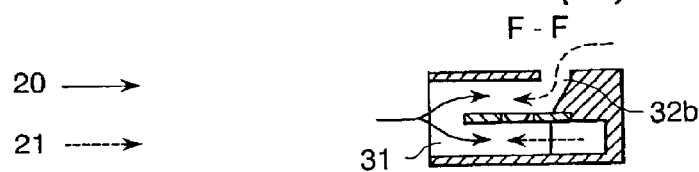

Next, FIG. 6 shows sectional views and a top view of a flow measurement sensor of a second embodiment according to the present invention. In a first embodiment, although the passage space is divided by the support member 11 into the portion where the flow measurement element 1 is disposed and the other portion located on the back side of the support member 11, the space is not completely separated. In a second embodiment, however, the passage space is completely separated by the support member 11 into the portion where the flow measurement element 1 is disposed and the other portion located on the back side of the support member 11. This structure which completely separates the passage space by the support member 11 without changing the cross section of the passage increases production costs due to the increase of the length of the support member. However, the measurement accuracy when pulsation and reverse flow occur significantly increases.

Figure 7A:
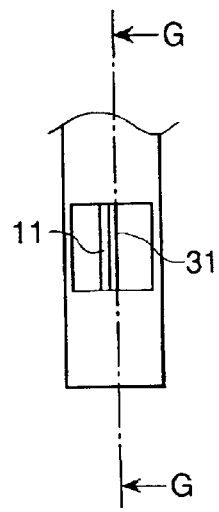
FIG. 7 shows a flow measurement sensor of a third embodiment of the present invention, wherein (A) is a top view of (B), (B) is a G—G sectional view of (A), and (C) is an H—H sectional view of (B).
Figure 7B:
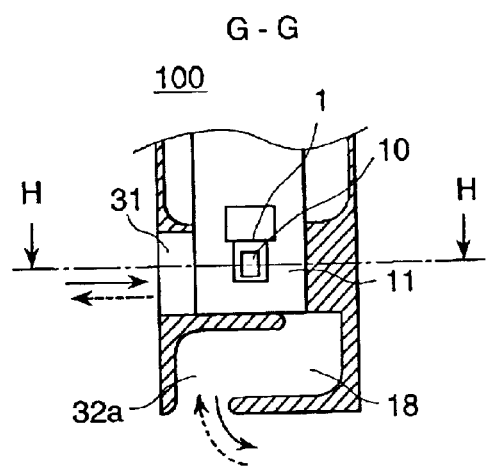
Figure 7C:
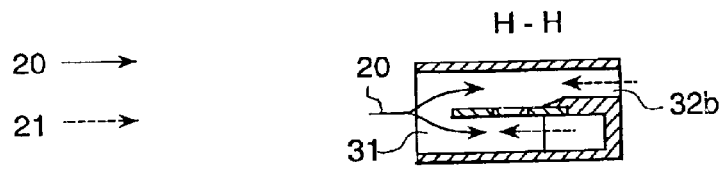

Next, a third embodiment of the present invention is shown in FIG. 7. FIG. 7 shows sectional views and a top view of a flow measurement sensor of a third embodiment. In this embodiment, a first outlet 32a opens in the direction perpendicular to the axial direction (air flow direction) of the main passage 16. Further, a second outlet 32b opens in the axial direction of the main passage 16, away from the first outlet 32a.

In this embodiment, since the second outlet 32b opens in the direction perpendicular to the axial direction of the main passage 16, reverse flow 21 easily enters from the outlet 32b. The reverse flow 21 from the first outlet 32a is disturbed at a bent portion of the bypass passage 18, while the reverse flow 21 from the second outlet 32b smoothly flows because of the absence of the bent portion, and can successfully respond to the switching of the forward-to-reverse flow direction in the main passage 16.

As described above, fast-response flow measurement elements which are produced by using semiconductor micro processing technology, as shown in Japanese Application Patent Laid-open Publication No.2001-183204 and Published Japanese Translation of a PCT Application, are disposed in the bypass passage 18 in which forward and reverse flows are unsymmetrical and reverse flow does not easily enter or so as to prevent the element from back fire from the engine side. Accordingly, as the pulsation amplitude becomes large causing an amount of the reverse flow in the main passage 16 to increase, the amount of the reverse flow guided into the bypass passage 18 tends to become insufficient. As a result, the plus measurement error increases. Further, when a flow measurement element 1 is disposed in a bypass passage 18 which has a bent portion, the response performance of the flow measurement element 1 slightly decreases compared to when the flow measurement element 1 is disposed in the main passage 16. Accordingly, the measurement error tends to occur specifically when engine speed is high, reverse flow 21 is present, and the pulsation amplitude is large.

Herein, as an amount of the reverse flow guided to the surface of the flow measurement element 1 is increased, the measurement error decreases in the area where engine speed is low and reverse flow is abundant, while the measurement error increases in the area where the pulsation amplitude at the start of generation of the reverse flow is small. Furthermore, the measurement error does not significantly decrease in the area where the engine speed is high.

However, according to a third embodiment of the present invention, it is possible that reverse flow is easily guided to the back side of the support member 11 without increasing the reverse flow on the surface of the flow measurement element, so that air flow on the surface of the flow measurement element 1 can be increased by being dragged by the reverse flow. This technology makes highly accurate measurement possible in the entire area regardless of the pulsation amplitude being small or large and at any engine speed.

Figure 8A:
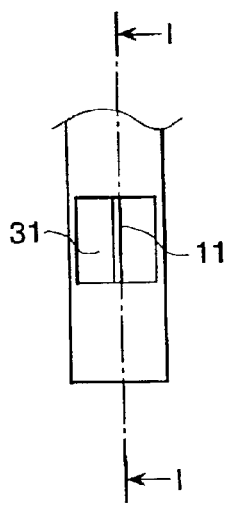
FIG. 8 shows a flow measurement sensor of a fourth embodiment of the present invention, wherein (A) is a top view of (B), (13) is an I—I sectional view of (A), and (C) is a J—J sectional view of (B).
Figure 8B:
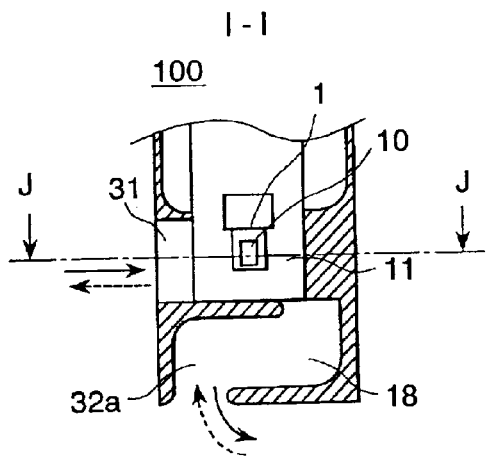
Figure 8C:
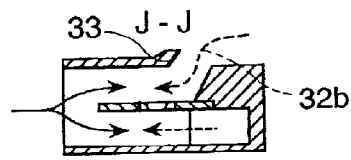

Next, FIG. 8 shows sectional views and a top view of a flow measurement sensor which is a fourth embodiment of the present invention. The fourth embodiment is an altered example of the third embodiment. In this embodiment, a protrusion 33 which extends in the direction perpendicular to the axial direction of the main passage 16 is provided on the upstream side of the second outlet 32b so as to be easily applied dynamic pressure of reverse flow 21, thereby the reverse flow 21 is easily guided from the second outlet. Further, as flow increases, forward flow tries to enter from the second outlet 32b, causing the flow around the vicinity of the second outlet to become unsteady, thereby generating flow noise. However, as shown in the fourth embodiment of the present invention, a protrusion provided at the upstream of the second outlet 32b prevents the forward flow from entering from the second outlet 32b. Consequently, the stable flow measurement is possible.

Further, it is also possible to provide a plurality of second outlets by making a combination with the first through fourth embodiments. Since an automobile engine is mounted in a limited space, in most cases, the intake pipe has bends at various locations. Depending on the shape of the bent of the intake pipe before and after the flow measurement sensor, the flow velocity distribution in the intake pipe under the steady flow condition is greatly different from the flow velocity distribution at the time of generation of the pulsation flow, and specifically the reverse flow tends to be destabilized. Since a flow measurement sensor measures the flow velocity in a certain area in the intake pipe, if the flow velocity distribution differs between under the steady flow condition and the pulsation flow condition, the measurement error occurs. However, as describe above, by providing outlets in various directions in the area on the back side of the support member to which the flow measurement element is not mounted, flow velocity components can be taken from various directions. Consequently, even if the flow velocity distribution in the intake pipe under the steady flow condition is greatly different from the flow velocity distribution at the time of generation of the pulsation flow, the flow can be accurately measured when pulsation flow accompanying reverse flow occurs.

In the first through fourth embodiments of the present invention mentioned above, the measurement accuracy when pulsation flow and the reverse flow occur is adequate. Therefore, if the dust-collecting performance of the air cleaner located at the upstream of the flow measurement sensor 100 is adequate, there will be no problems. However, if an air filter of the air cleaner is removed, or if particles which have passed through the air filter accumulate to become large by crosslinking a liquid, such as oil or water present in the intake pipe, there is a possibility that particles which may damage the thin film member 10 of the flow measurement element may reach the surface of the flow measurement element 1. Specifically, in a flow measurement element produced by using semiconductor micro processing technology, the thickness of the thin film structure 10 is approximately 1 to 2 µm. Accordingly, if dust present in the intake air impinges on the thin film structure 10 or moisture adheres to the thin film structure, the thin film structure 10 may be damaged.

Therefore, in order to provide a flow measurement sensor 100 which has long-lasting reliability, it is necessary to structure the sensor such that air reaches the surface of the flow measurement element 1 but dust and moisture are kept away. As a means to solve this problem, a bypass passage 18, shown in FIG. 9, which is a fifth embodiment of the present invention is effective. In this embodiment, the radius of the bypass passage 18 gradually becomes small in the direction of forward flow in the bypass passage. The flow measurement element is disposed inside in the radial direction from the outer-wall surface of the bypass passage. Further, a first outlet 32a faces the direction perpendicular to the axial direction of the main passage 16. A first outlet 32a opens in the direction perpendicular to the axial direction of the main passage 16. Further, a second outlet 32b opens in the axial direction of the main passage 16, away from the first outlet 32a.

Figure 10:
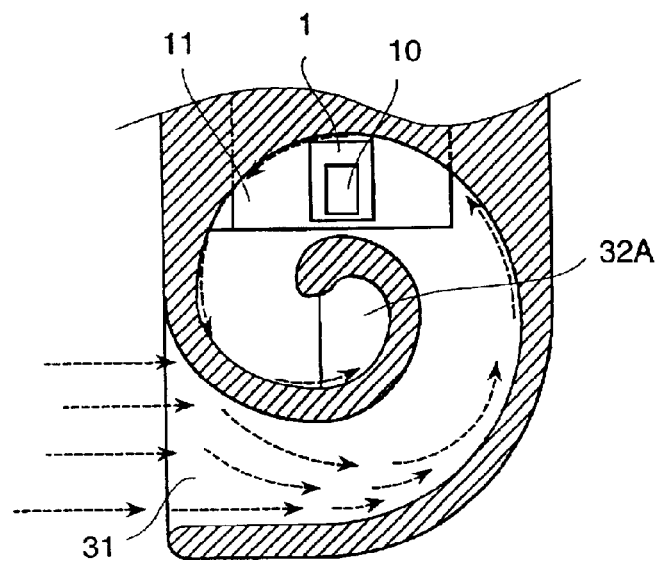
FIG. 10 is an explanatory drawing of the operations of a fifth embodiment.

The bypass passage 18 of this embodiment generates a centrifugal force in the bypass passage because the radius of the passage gradually becomes small in the direction of forward flow in the bypass passage. This centrifugal force carries dust and moisture in such a way that they are pushed onto the outer-wall surface as shown in FIG. 10. Accordingly, dust and moisture do not reach the surface of the flow measurement element 1 which is disposed inside in the radial direction from the outer-wall surface.

Figures 9A, 9B, 9D:
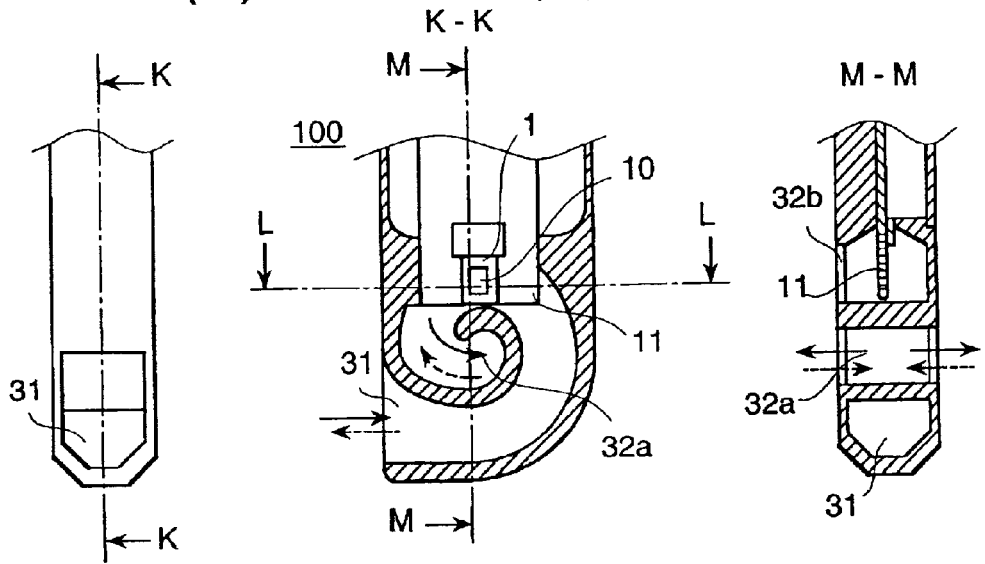
FIG. 9 shows a flow measurement sensor of a fifth embodiment of the present invention, wherein (A) is a top view of (B), (B) is a K—K sectional view of (A), (C) is an L—L sectional view of (B), and (D) is an M—M sectional view of (B).
Figure 9C:
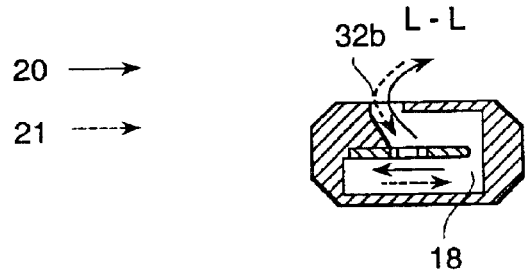

With regard to a fifth embodiment of the present invention which employs aforementioned technology, description will be made with reference to FIG. 9. This bypass passage 18 is a spiral passage and while air flow enters from an inlet 31, flows through the spiral passage, and finally reaches the flow measurement element 1, polluting substances, such as dust and moisture, are pushed onto the outer-periphery surface by a centrifugal force and then discharged directly from the outlet 32a. Therefore, the structure prevents polluting substances from reaching the surface of the flow measurement element 1. As a result of experiments in which particles of approximately 5 to 200 μm were continuously input into the main passage 16 at a flow velocity of 50 m/s or more, oilily the traces of dust particles measuring 5 μm or less were found to have impacted on the surface of the flow measurement element 1. It is possible to strengthen the thin film structure 10 of the flow measurement element 1 to a certain extent that the thin film structure is not damaged when particles of approximately 15 μm impinges on the thin film structure at a flow velocity of 50 m/s. Therefore, using the bypass passage 18 makes it possible to prevent the thin film structure from being damaged by dust. On the other hand, with regard to moisture, as a result of experiments in which water of approximately 20 L/min. was continuously input into the main passage 16, outputs of the flow measurement sensor 100 do not change. This proves that moisture does not adhere to the surface of the flow measurement element 1.

In a fifth embodiment of the present invention, as well as the first embodiment of the present invention mentioned above, it is possible to reduce the measurement error when pulsation flow accompanying reverse flow 21 occurs. Accordingly, this structure makes it possible to provide a flow measurement sensor 1 which has high reliability and good pulsation response characteristic.

Although in this structure, depending on the mounting of the flow measurement sensor 1, water generated by the condensation on the support member 11 easily remains inside the bypass passage 18. However, if a second outlet is provided in the present invention, the remaining water will be discharged, thereby further increasing the reliability.

Figure 11:
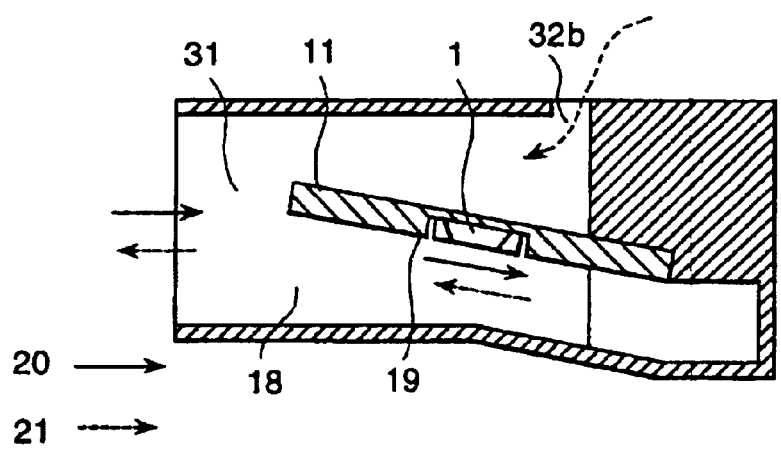
FIG. 11 is a sectional view that shows a flow measurement sensor of a sixth embodiment of the present invention.

Next, FIG. 11 shows a sectional view and a top view of a flow measurement sensor which is a sixth embodiment of the present invention. FIG. 11 is a sectional drawing which corresponds to that of B—B in FIG. 1 or L—L in FIG. 9. A flow measurement element 1 is fixed to the concaved portion 19 provided in one side of the support member 11 so that its surface becomes slightly lower than the flat surface of the support member 11. In this embodiment, the support member 11 is disposed in the bypass passage 18 being inclined at an angle to the main passage 16. That is, the support member 11 is disposed so that one side of the support member 11 to which the flow measurement sensor 1 is mounted, in other word, the side which communicates with the first outlet 32a of the bypass passage 18 is inclined so as to receive (face) forward flow. Moreover, the first outlet 32a opens in the direction perpendicular to the axial direction of the main passage 16. Further, a second outlet 32b opens away from the first outlet 32a.

When the support member 11 is not inclined, flow deviation easily occurs at the point where the flow in the bypass passage 18 is separated into the face side flow and the back side flow by the support member 11. The deviation easily becomes a factor of the instability (output noise) at the time of the measurement. Further, as shown in the present invention, in a flow measurement sensor which performs flow measurement on the surface of the plate-shaped, rectangular parallelepiped, flow measurement element 1, very small installation deviation of the support member by 1 degree or less to the flow during the mass production process becomes a factor of the variation of the performance of the flow measurement sensor. Therefore, as shown in FIG. 11, by inclining the support member 11, the flow deviation generated at an end portion of the support member will not easily affect the surface of the flow measurement element 1. Accordingly, output noise can be reduced at the time of the flow measurement. Furthermore, the variation of the performance during the mass production process can also be suppressed.

Figure 12:
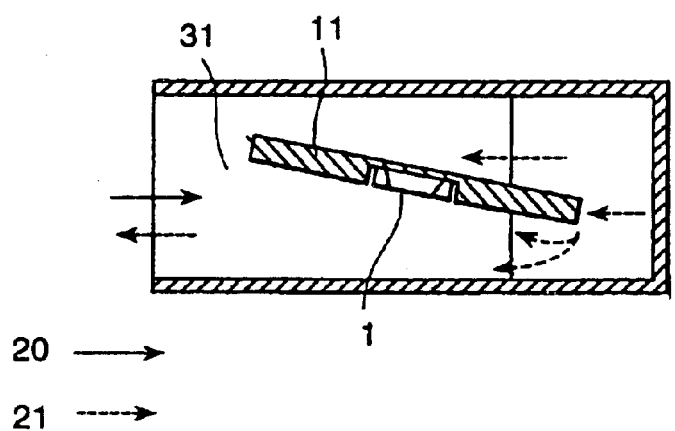
FIG. 12 is an explanatory drawing that shows an inclined support member in a conventional example.

For reference, FIG. 12 shows an inclined support member 11 disposed in the bypass passage according to the conventional example. In the conventional bypass passage, the aforementioned performance in the direction of forward flow can be improved by inclining the support member 11. However, when reverse flow 21 is guided into the bypass passage 18, the reverse flow impinges on the back side of the support member 11, thereby the reverse flow 21 does not easily come in contact with the flow measurement element 1. Accordingly, there is a problem that the measurement accuracy decreases when reverse flow 21 occurs.

According to the present invention, as shown in FIG. 11, by providing an arrangement such that the second outlet 32b is created and reverse flow 21 which flows along the surface of the flow measurement element 1 comes in contact with the flow measurement element 1 in parallel, it is possible to provide a flow measurement sensor 100 which has high reliability, good pulsation response and output noise reduction characteristics.

The flow measurement element 1 which is produced by using semiconductor micro processing technology has been described above. In addition, even when the flow measurement element is made with a platinum resistance or the like formed on the surface of the alumina substrate, the structures as described in the first through sixth embodiments are applicable.

Figure 13A:
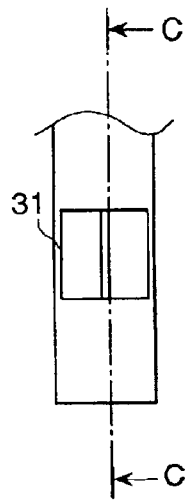
FIG. 13 shows a flow measurement sensor which is an altered example of a first embodiment of the present invention, wherein (A) is a top view of (B), (B) is a C—C sectional view of (A), and (C) is a D—D sectional view of (B).
Figure 13B:
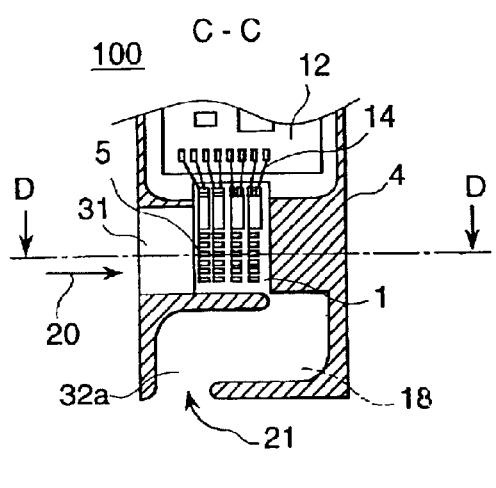
Figure 13C:
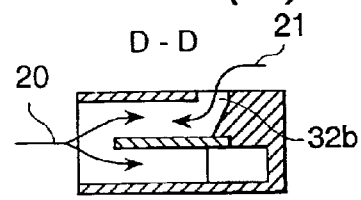

Now, with reference to FIG. 13, description will be made in regard to an example in which a flow measurement element 1 made with a platinum resistance or the like formed on the surface of the alumina substrate is applied to a first embodiment. Since resistances 4 and 5 of the flow measurement element 1 are formed on one side of the alumina substrate, a second outlet 32b is formed on the surface to which the resistance for the alumina substrate is not formed. This arrangement can obtain the same effect as the aforementioned first embodiment. Further, reference number 14 shows a connecting line which connects the flow measurement element 1 with a control circuit 12.

Figure 14:
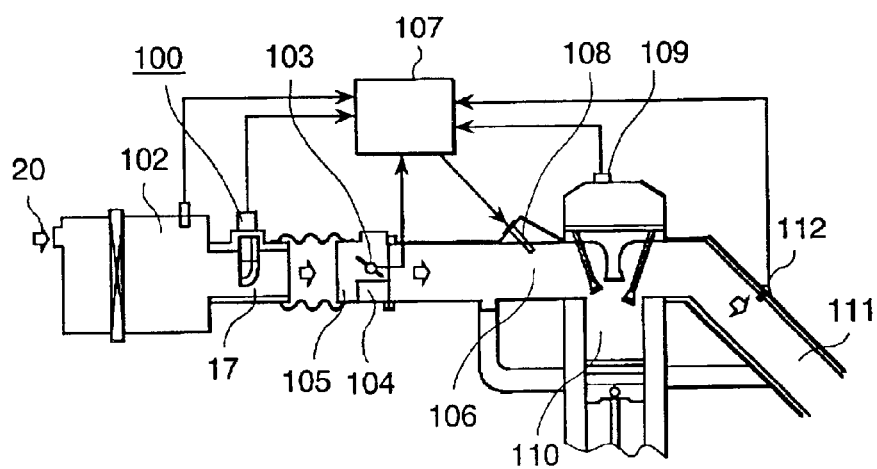
FIG. 14 shows an example of an internal combustion engine control system which uses a flow measurement sensor according to the present invention.

Furthermore, FIG. 14 is a system diagram of an internal combustion engine, such as a gasoline engine or the like, that incorporates a flow measurement sensor 100 which employs each embodiment of the present invention. A Throttle Body 105 and an intake manifold 106 are incorporated into an intake pipe 17. The Throttle Body 105 is equipped with a throttle angle sensor 103 and an idling speed control valve 104. Intake air is induced into an engine cylinder 110 via an air cleaner 102 and a main passage, i.e. an intake air flow passage 17. A flow measurement sensor 100 of the present invention is disposed halfway in the intake air flow passage 17 and detects the flow amount and the flow direction The detected flow signals are input into a vehicle control unit 107 by means of the voltage or frequency. Further, an oxygen analyzer 112 is provided in an exhaust manifold 111 so that the exhaust gas oxygen concentration signal can be input into the vehicle control unit 107. Furthermore, the throttle angle signal and the engine speed signal detected by a tachometer 109 are also input into the vehicle control unit 107.

The vehicle control unit 107 controls the amount of fuel injected from an injector 108 and injection Aiming based on those signals. The detected flow signals are also used to control other sub systems. Since a flow measurement sensor 100 according to the present invention can reduce the measurement error at the time of generation of the pulsation flow and has high reliability, employing this sensor will greatly improve the engine's fuel supply control characteristic.

Moreover, in the case of a diesel engine system, not shown, the basic structure is almost same as that of the gasoline system. Therefore, a flow measurement sensor according to the present invention is applicable.

Furthermore, in systems which use Fuel Cell, such as an electric automobile and the like, this technology is applicable to a flow measurement sensor for measuring a fluid such as air or hydrogen.

According to the present invention, it is possible to provide a low-error flow measurement sensor for an engine which generates pulsation flow with a large pulsation amplitude that accompanies reverse flow and pulsation flow with high frequency, without decreasing its reliability due to the presence of water droplets on the flow measurement element or without decreasing the measurement accuracy due to the thermal effect from the engine.

Further, in addition to the aforementioned structure, by applying the present invention to the bypass passage which generates a centrifugal force, it is possible to provide a flow measurement sensor which has good pulsation response characteristic and high reliability.

Furthermore, in addition to the aforementioned structure, by inclining the support member, it is possible to provide a flow measurement sensor in which flow noise is weak under the steady flow condition.

What is claimed is:

1. A flow measurement sensor comprising a flow measurement element having a heater resistance pattern provided on one side of a plate-shaped member, and a bypass passage in which the flow measurement element is disposed, wherein said bypass passage comprises a common inlet, a first outlet through which fluid that has entered from the inlet and flows along the surface of said flow measurement element flows out, and a second outlet through which fluid that has entered from the inlet and flows along the back side of said flow measurement element flows out, and said second outlet is positioned at a different location from said first outlet.

2. A flow measurement sensor according to claim 1, wherein said first outlet faces the direction perpendicular to the axial direction of the main passage in which said flow measurement sensor is mounted, and said second outlet opens in the direction perpendicular to the axial direction of said main passage and also facing the opposite side of said first outlet.

3. A flow measurement sensor according to claim 1, wherein said first outlet faces the direction perpendicular to the axial direction of the main passage in which said flow measurement sensor is mounted, and said second outlet opens in the axial direction of said main passage.

4. A flow measurement sensor according to claim 1, wherein a protrusion is provided on the upstream side in the forward flow of the second outlet.

5. A flow measurement sensor according to claim 1, wherein a resistance of said flow measurement element is formed on one side of an alumina substrate, and said second outlet is formed on the other surface of the alumina substrate.

6. A flow measurement sensor according to claim 1, wherein radius of said bypass passage gradually becomes smaller in the direction of the forward flow in the bypass passage, and said flow measurement element is disposed inside in the radial direction from the outer-wall surface of said bypass passage.

7. An internal combustion engine which installs a flow measurement sensor according to claim 1 in an intake air passage to measure the intake air flow thereby controlling fuel supply.

8. A flow measurement sensor comprising a flow measurement element having a heater resistance pattern provided on one side of a plate-shaped member, a support member to which said flow measurement element is mounted, and a bypass passage in which said support member is disposed, wherein said bypass passage comprises a common inlet, a first outlet through which fluid that has entered from the inlet and flows along the surface of said flow measurement element flows out, and a second outlet through which fluid that has entered from the inlet and flows along said support member surface to which said flow measurement element is not mounted flows out, and said second outlet is positioned at a different location from said first outlet.

9. A flow measurement sensor according to claim 8, wherein said flow measurement element is mounted to one side of said support member so that its surface becomes lower than the flat surface of said support member.

10. A flow measurement sensor according to claim 9, wherein said flow measurement element or said support member is disposed such that the flow measurement sensor mounting side is inclined so as to face the forward flow in the main passage in which the flow measurement sensor is mounted.

11. A flow measurement sensor according to claim 8, wherein said support member is located near the center of said bypass passage, and the support member divides said bypass passage into a first passage through which fluid flows along the support member surface to which said flow measurement element is not mounted, and a second passage through which fluid flows along the surface of said flow measurement element.

12. A flow measurement sensor according to claim 8, wherein said bypass passage is completely separated into a first passage through which fluid flows along said support member surface to which said flow measurement element is not mounted or the back side of said flow measurement element, and a second passage through which fluid flows along the surface of said flow measurement element.

13. A flow measurement sensor according to claim 12, wherein said flow measurement element is mounted to one side of said support member so that its surface becomes lower than the flat surface of said support member.

14. A flow measurement sensor according to claim 8, wherein said first outlet faces the direction perpendicular to the axial direction of the main passage in which said flow measurement sensor is mounted, and said second outlet opens in the direction perpendicular to the axial direction of said main passage and also facing the opposite side of said first outlet.

15. A flow measurement sensor according to claim 8, wherein said first outlet faces the direction perpendicular to the axial direction of the main passage in which said flow measurement sensor is mounted, and said second outlet opens in the axial direction of said main passage.

16. A flow measurement sensor according to claim 8, wherein a protrusion is provided on the upstream side in the forward flow of the second outlet.

17. A flow measurement sensor according to claim 8, wherein a resistance of said flow measurement element sis formed on one side of an alumina substrate, and said second outlet is formed on the other surface of the alumina substrate.

18. A flow measurement sensor according to claim 8, wherein radius of said bypass passage gradually becomes smaller in the direction of the forward flow in the bypass passage, and said flow measurement element is disposed inside in the radial direction from the outer-wall surface of said bypass passage.

19. A flow measurement sensor according to claim 8, wherein said flow measurement element or said support member is disposed such that the flow measurement sensor mounting side is inclined so as to face the forward flow in the main passage in which the flow measurement sensor is mounted.

* * * * *